United States Patent
Spindler et al.

(10) Patent No.: US 11,765,262 B2
(45) Date of Patent: Sep. 19, 2023

(54) CUSTOMER CAPTURE USING DYNAMICALLY GENERATED CUSTOMIZED WEBPAGES

(71) Applicant: IQX CORP., Beverly Hills, CA (US)

(72) Inventors: Sacha Spindler, Vancouver (CA); Andrew Lewin, Vancouver (CA); Aidan Wright, Tigard, OR (US)

(73) Assignee: IQX CORP., Beverly Hills, CA (US)

( * ) Notice: Subject to any disclaimer, the term of this patent is extended or adjusted under 35 U.S.C. 154(b) by 34 days.

(21) Appl. No.: 17/279,188

(22) PCT Filed: Sep. 25, 2019

(86) PCT No.: PCT/US2019/052847
§ 371 (c)(1),
(2) Date: Mar. 24, 2021

(87) PCT Pub. No.: WO2020/068911
PCT Pub. Date: Apr. 2, 2020

(65) Prior Publication Data
US 2022/0006895 A1    Jan. 6, 2022

Related U.S. Application Data

(60) Provisional application No. 62/737,315, filed on Sep. 27, 2018.

(51) Int. Cl.
*H04L 9/40* (2022.01)
*H04M 1/72445* (2021.01)
(Continued)

(52) U.S. Cl.
CPC ... *H04M 1/72445* (2021.01); *H04M 1/72436* (2021.01); *H04W 4/14* (2013.01); *H04W 4/20* (2013.01); *H04W 12/06* (2013.01)

(58) Field of Classification Search
CPC ......... H04M 1/72445; H04M 1/72436; H04W 4/14; H04W 4/20; H04W 12/06;
(Continued)

(56) References Cited

U.S. PATENT DOCUMENTS

2007/0174448 A1* 7/2007 Ahuja ................. G06Q 20/403
                                                                709/224
2007/0255620 A1   11/2007 Tumminaro et al.
(Continued)

*Primary Examiner* — Joseph E Dean, Jr.
(74) *Attorney, Agent, or Firm* — Aurora Consulting LLC; Kristen J. Hansen; Ashley Sloat

(57) ABSTRACT

A computer that dynamically generates a customized second document is described. During operation, the computer receives information specifying activation of a hosted field in a document associated with a third party, where the information specifies a willingness to receive one or more messages from the computer and specifies a telephone number. In response, the computer dynamically generates the customized second document that includes information about one or more transactions (such as one or more upcoming events) of interest to an individual associated with the telephone number. Then, the computer sends a message to an address corresponding to the telephone number, where the message includes a link to the customized second document. Next, when the computer receives information specifying activation of the link from an electronic device, the computer provides information specifying the customized second document to the electronic device for display on the electronic device.

18 Claims, 8 Drawing Sheets

(51) Int. Cl.
*H04M 1/72436* (2021.01)
*H04W 4/14* (2009.01)
*H04W 4/20* (2018.01)
*H04W 12/06* (2021.01)

(58) Field of Classification Search
CPC ........ G06Q 20/02; G06Q 20/12; G06Q 20/38; G06Q 20/40; H04L 63/0853; H04L 63/18
See application file for complete search history.

(56) References Cited

U.S. PATENT DOCUMENTS

2012/0185382 A1    7/2012   Fischer
2018/0103004 A1*   4/2018   Demir ..................... H04L 51/52

\* cited by examiner

CUSTOMER CAPTURE USING DYNAMICALLY GENERATED CUSTOMIZED WEBPAGES

CROSS-REFERENCE TO RELATED APPLICATIONS

This application is the U.S. National Stage filing for PCT Application Ser. No. PCT/US19/52847 filed Sep. 25, 2019, now published as WO 2020/068911, which claims the priority benefit of U.S. Provisional Patent Application Ser. No. 62/737,315, filed Sep. 27, 2018, the contents of which are herein incorporated by reference in their entirety.

BACKGROUND

The described embodiments relate, generally, to techniques for performing transactions using dynamically generated customized webpages.

The ease of use and widespread availability of networks, such as the Internet, have made it much easier for people to perform online transactions, such as purchasing products or services (which are sometimes referred to as 'e-commerce').

However, the popularity of such online transactions has resulted in increased incidents of fraud and other criminal activity. This criminal behavior undermines people's trust and, thus, constrains people's willingness to conduct transactions via networks.

Moreover, many webpages or websites have largely static content that is presented or served to all visitors. For example, visitors to a particular web site may be steered to a common landing webpage.

While this one-size-fits-all approach is efficient and can be easily scaled, it often results in a cumbersome user experience, as visitors are forced to navigate through the content on a webpage or website in an attempt to find relevant or interesting information. Consequently, the negative user experience associated with many webpages and websites also restricts use and, thus, people's willingness to conduct transactions.

SUMMARY

A first group of embodiments provides a computer for facilitating transactions. This computer includes an interface circuit that can communicate with an electronic device, memory that stores program instructions, and a processor that can execute the program instructions. During operation, the computer receives information specifying activation of a hosted field in a document associated with a third party, where the information specifies a willingness to receive one or more messages from the computer and specifies a telephone number. In response, the computer dynamically generates a customized second document that includes information about one or more transactions (such as one or more upcoming events or other purchasable tickets, merchandise, products, etc.) of interest to an individual associated with the telephone number. Then, the computer sends a message to an address corresponding to the telephone number, where the message includes a link to the customized second document. Next, when the computer receives information specifying activation of the link from an electronic device, the computer provides information specifying the customized second document to the electronic device for display on the electronic device.

Note that the document may be a third-party webpage. Moreover, the message may include a Short Message Service (SMS) message. Furthermore, the customized second document may include a webpage.

Furthermore, the customized second document may allow completion of a given transaction in the one or more transactions, such as purchasing one or more tickets to an upcoming event. Additionally, the computer provides authentication information (such as an authentication cookie) to the electronic device to authenticate purchases. For example, a purchase request received by the computer from the electronic device and associated with the customized second document may be rejected if the authentication information is not stored on the electronic device. Note that the authentication information may be valid for a predefined time interval. After this predefined time interval has elapsed, the authentication information may expire.

In some embodiments, after receiving the information specifying activation of the hosted field, the computer may confirm that the telephone number is included in a data structure prior to dynamically generating the customized webpage. If the telephone number is included in the data structure, the computer may proceed and dynamically generate the customized second document. Otherwise, the computer may confirm that the individual wants to receive the one or more messages prior to dynamically generating the customized second document.

Moreover, the one or more transactions of interest to the individual may be associated with an entity (such as an event organizer), and the individual may have a subscription with the entity.

Furthermore, when the computer receives a request message with a predefined code addressed to a second address corresponding to a second telephone number associated with the computer, the computer may dynamically generate a customized third document that includes information about one or more additional transactions of interest to the individual associated with the telephone number. Then, the computer may provide a second message addressed to the address corresponding to the telephone number, where the second message includes a link to the customized third document. Note that the code may include an alphanumeric value.

Another embodiment provides a computer-readable storage medium for use with the computer. This computer-readable storage medium includes program instructions for at least some of the operations performed by the computer.

Another embodiment provides a method for dynamically generating a customized document. This method includes at least some of the operations performed by the computer.

A second group of embodiments provides a computer that injects a host field into a document associated with a third party.

Another embodiment provides a computer-readable storage medium for use with the computer. This computer-readable storage medium includes program instructions for at least some of the operations performed by the computer.

Another embodiment provides a method for injecting a host field into a document associated with a third party. This method includes at least some of the operations performed by the computer.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
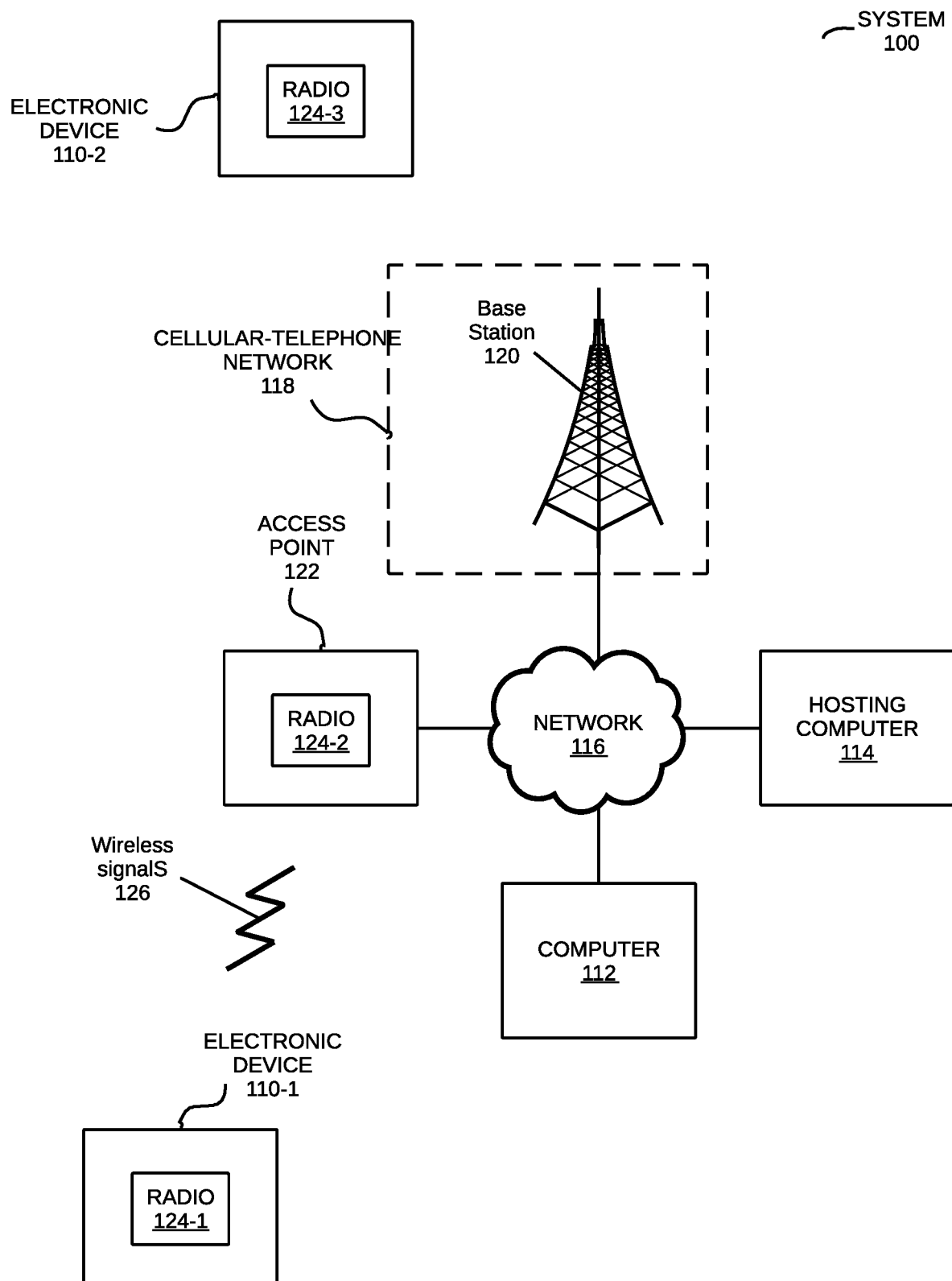
FIG. 1 is a block diagram illustrating an example of a system with electronic devices wirelessly communicating in accordance with an embodiment of the present disclosure.

A computer that dynamically generates a customized second document is described. During operation, the computer receives information specifying activation of a hosted field in a document associated with a third party (or potential client), where the information specifies a willingness to receive one or more messages from the computer and specifies a telephone number. In response, the computer dynamically generates a customized second document that includes information about one or more transactions (such as one or more upcoming events) of interest to an individual (or potential subscriber customer) associated with the telephone number. Then, the computer sends a message to an address corresponding to the telephone number, where the message includes a link to the customized second document. Next, when the computer receives information specifying activation of the link from an electronic device, the computer provides information specifying the customized second document to the electronic device for display on the electronic device.

By providing the dynamically generated customized second document, this communication technique facilitates secure performance of a given transaction in the one or more transactions. Moreover, the dynamically generated customized second document may include customized content that is relevant to the individual (or potential subscriber customer). This may allow the individual (or potential subscriber customer) to directly access information that is of interest to them. Consequently, the communication technique may simplify the user experience, thereby increasing the likelihood that the individual (or potential subscriber customer) conducts the given transaction. In the process, the communication technique may increase satisfaction of the individual (or potential subscriber customer) and an entity associated with the one or more transactions, such as an event organizer (or potential client).

In the discussion that follows, electronic devices and computers may include radios or, more generally, network interfaces that communicate packets or frames in accordance with one or more communication protocols, such as: an Institute of Electrical and Electronics Engineers (IEEE) 802.11 standard (which is sometimes referred to as 'Wi-Fi®,' from the Wi-Fi® Alliance of Austin, Texas), Bluetooth™ (from the Bluetooth Special Interest Group of Kirkland, Washington), a cellular-telephone communication protocol, another type of wireless interface, a wired network communication protocol (e.g., Ethernet, Ethernet II or an IEEE 802.3 standard, which are individually or collectively henceforth referred to as 'Ethernet') and/or another network communication protocol. For example, the cellular-telephone communication protocol may include or may be compatible with: a $2^{nd}$ generation or mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used. In addition, the communication may occur via a wide variety of frequency bands. In the discussion that follows, Ethernet (which is sometimes referred to as a 'non-wireless communication technique' or protocol) is used as an illustrative example.

Communication among electronic devices is shown in FIG. 1, which presents a block diagram illustrating an example of a system 100 that includes electronic devices 110 (such as a computer, a portable electronic device, a cellular telephone, a tablet computer, a smartwatch, a wearable device, etc.), computer 112 (such as a cloud-based computer or server), and hosting computer 114 that communicate with each other using wired (or non-wireless communication) via network 116 (such as the Internet) and/or optional wireless communication via a cellular-telephone network 118 (e.g., via an optional base station 120), a wireless local area network (e.g., via an optional access point 122) and/or a another wireless communication technique. Note that the optional access point 122 may provide access to network 116, such as the Internet, via an Ethernet protocol, and may be a physical access point or a virtual or 'software' access point that is implemented on a computer or an electronic device.

As described further below with reference to FIGS. 2-3, computer 112 may inject a hosted field into a document provided by hosting computer 114. For example, computer 112 may provide, via network 116, the hosted field for inclusion in a webpage associated with a third party (i.e., that is other than a provider of the communication technique), and that is provided, via network 116 and cellular-telephone network 118 (or the optional access point 122), by hosting computer to one of electronic devices 110 (such as electronic device 110-1). An application (such as a Web browser) executed in an environment of electronic device 110-1 (such as an operating system) may display the document. Note that the hosted field may allow a user of electronic device 110-1 (who is sometimes referred to as an 'individual') to indicate a willingness to receive one or more messages from computer 112 and that specifies a telephone number associated with electronic device 110-1. Such user may be called a subscriber customer.

When the user or subscriber customer activates the hosted field and provides the telephone number, electronic device 110-1 may provide, via network 116 and cellular-telephone network 118 (or the optional access point 122), information specifying activation of the hosted field in the document and the telephone number to hosting computer 114. In turn, hosting computer 114 may provide, via network 116, this information to computer 112.

After receiving the information specifying activation of the hosted field in the document, computer 112 may dynamically generate a customized second document (such as a webpage) that includes information about one or more transactions (such as one or more upcoming events) of interest to the individual or subscriber customer associated with the telephone number. Then, computer 112 may send a message to an address corresponding to the telephone number, where the message includes a link to the customized second document. For example, the message may be sent via network 116 and cellular-telephone network 118 (or the optional access point 122). Note that the message may include a Short Message Service (SMS) message (which is sometimes referred to as a 'text message').

Moreover, after receiving the message, electronic device 110-1 may display the message. If the individual or subscriber customer activates the link, electronic device 110-1 may provide, via network 116 and cellular-telephone network 118 (or the optional access point 122), information specifying activation of the link to computer 112.

When computer 112 receives information specifying activation of the link from electronic device 110-1, computer 112 may provide, via network 116 and cellular-telephone network 118 (or the optional access point 122), information specifying the customized second document to electronic device 110-1 for display on the electronic device (such as by the application executing on electronic device 110-1). Furthermore, as described further below, computer 112 may provide, via network 116 and cellular-telephone network 118 (or the optional access point 122), authentication information (such as an authentication cookie) to electronic device 110-1 to authenticate completion of a given transaction in the one or more transactions. Note that the authentication information may be valid for a predefined time interval, such as 1 day, a week, or a month. After this predefined time interval has elapsed, the authentication information may expire.

Additionally, the customized second document may allow completion of the given transaction in the one or more transactions, such as purchasing one or more tickets to an upcoming event. For example, the individual or subscriber customer may interact with the customized second document to provide, via network 116 and cellular-telephone network 118 (or the optional access point 122), to exchange information with computer 112 to complete the transaction As noted previously, a purchase request received from electronic device 110-1 and associated with the customized second document may be rejected by computer 112 if the authentication information is not stored on electronic device 110-1.

In some embodiments, after receiving the information specifying activation of the hosted field, computer 112 may confirm that the telephone number is included in a data structure (such as a data structure with information about subscribers to a transaction service) prior to dynamically generating the customized webpage. For example, the one or more transactions of interest to the individual or subscriber customer may be associated with an entity (such as an event organizer also referred to herein as a client of the system), and the individual or subscriber may have a subscription with the entity or client. If the telephone number is included in the data structure, computer 112 may proceed and dynamically generate the customized second document. Otherwise, computer 112 may communicate, via network 116 and cellular-telephone network 118 (or the optional access point 122), with electronic device 110-1 to confirm that the individual or subscriber customer wants to receive the one or more messages prior to dynamically generating the customized second document.

Moreover, the individual or subscriber customer may use electronic device 110-1 to request a dynamically generated customized third document. For example, electronic device 110-1 may provide, via network 116 and cellular-telephone network 118 (or the optional access point 122), a request message with a predefined code (such as an alphanumeric code) addressed to a second address corresponding to a second telephone number associated with computer 112. In response, computer 112 may dynamically generate the customized third document that includes information about one or more additional transactions of interest to the individual or subscriber customer associated with the telephone number. Then, computer 112 may provide, via network 116 and cellular-telephone network 118 (or the optional access point 122), another message addressed to the address corresponding to the telephone number, where the other message includes a link to the customized third document.

In these ways, the communication techniques may be used to facilitate the conducting of one or more transactions in a secure manner. Moreover, because an instance of the dynamically generated customized document is tailored, at a particular time, to the specific interests of the individual or subscriber customer, the content included in the instance of the customized document may be more relevant to the individual or subscriber customer and immediately actionable (without, e.g., requiring that the individual navigate to content that may be of interest to them). This capability may enhance the user experience of the individual or subscriber customer and may encourage the individual or subscriber customer to perform one or more transactions. The communication technique may enable a customer capture rate of greater than 10%, 15%, 20%, 25%, or 30%. For example, the customer capture rate may be 14.5%.

As noted previously, in some embodiments, communication among components in system 100 involves wireless communication. During the wireless communication, electronic devices 110, the optional base station 120 and/or the optional access point 122 may: transmit advertising frames on wireless channels, detect one another by scanning wireless channels, establish wireless connections (for example, by transmitting association requests), and/or transmit and receive packets or frames (which may include the association requests and/or additional information as payloads). Moreover, during the wired communication, electronic devices 110, computer 112, and/or the hosting computer 114 may receive packets or frames using a wired communication technique or protocol (e.g., Ethernet II or an IEEE 802.3 standard). In some embodiments, the optional base station 118 and/or the optional access point 122 may convert packets or frames that are received using the wired communication technique to a WLAN communication technique or protocol (such as an IEEE 802.11 standard or an LTE standard), and may wirelessly transmit the packets or frames. Similarly, the optional base station 118 and/or the optional access point 122 may: receive packets or frames using the WLAN communication technique; convert the packets or frames to the wired communication technique; and transmit the packets or frames. Thus, the optional base station 118 and/or the optional access point 122 may perform the functions of an access point.

As described further below with reference to FIG. 8, electronic devices 110, computer 112, hosting computer 114, the optional base station 120 and/or the optional access point 122 may include subsystems, such as: a networking subsystem, a memory subsystem and a processor subsystem. In addition, electronic devices 110, computer 112, hosting computer 114, the optional base station 120 and/or the optional access point 122 may include radios 124 in the networking subsystems. (Note that radios 124 may be instances of the same radio or may be different from each other.) More generally, electronic devices 110, computer 112, hosting computer 114, the optional base station 120 and/or the optional access point 122 can include (or can be included within) any electronic devices with the networking subsystems that enable electronic devices 110, computer 112, hosting computer 114, the optional base station 120 and/or the optional access point 122 to communicate with each other using wired communication (e.g., a non-wireless communication technique) and/or optional wireless communication. The optional wireless communication can comprise transmitting advertisements on wireless channels to enable electronic devices to make initial contact or detect each other, followed by exchanging subsequent data/management frames (such as association requests and responses) to establish a wireless connection, configure security options (e.g., Internet Protocol Security), and transmit and receive packets or frames via the wireless connection, etc.

As can be seen in FIG. 1, wireless signals 126 (represented by a jagged line) are optionally transmitted from radio 124-1 in electronic device 110-1. These wireless signals are optionally received by at least the optional access point 122. Notably, electronic device 110-1 may optionally transmit packets. In turn, these packets may be optionally received by a radio 124-2 in the optional access point 122. This may allow electronic device 110-1 to wirelessly communicate information to the optional access point 122. While FIG. 1 illustrates electronic device 110-1 transmitting packets, note that electronic device 110-1 may also receive packets from the optional access point 122.

In the described embodiments, processing of a packet or frame in electronic devices 110, the optional base station 120 and/or the optional access point 122 includes: receiving signals (such as wireless signals 126) with the packet or frame; decoding/extracting the packet or frame from the received signals to acquire the packet or frame; and processing the packet or frame to determine information contained in the packet or frame.

Note that the communication among electronic devices 110, computer 112, the hosting computer 114, the optional base station 120 and/or the optional access point 122 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization').

In these ways, the communication techniques may provide an efficient and secure way for the individual to receive relevant content and to conduct one or more transactions.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While electronic devices 110 and optional access point 122 are illustrated with a single instance of radios 124, in other embodiments, electronic devices 110, optional access point 120 and/or another component in system 100 may include multiple radios.

Figure 2:
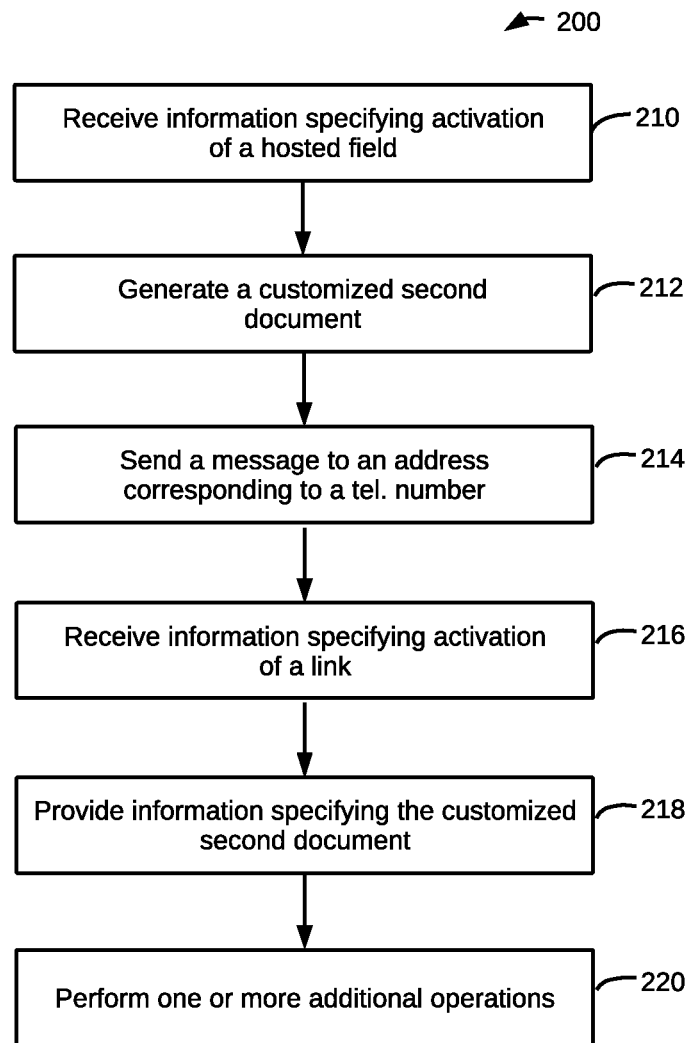
FIG. 2 is a flow diagram illustrating an example method for dynamically generating a customized document in accordance with an embodiment of the present disclosure.

FIG. 2 presents a flow diagram illustrating example method 200 for dynamically generating a customized document, which may be performed by a computer (such as computer 112 in FIG. 1). During operation, the computer may receive information (operation 210) specifying activation of a hosted field in a document associated with a third party or client, where the information specifies a willingness to receive one or more messages from the computer and specifies a telephone number. Note that the document may be a third-party or client webpage.

In response, the computer may dynamically generate a customized second document (operation 212) that includes information about one or more transactions (such as one or more upcoming events) of interest to an individual or subscriber customer associated with the telephone number. Notably, the customized second document may include a webpage. In some embodiments, the one or more transactions of interest to the individual or subscriber customer may be associated with an entity (such as an event organizer), and the individual or subscriber customer may have a subscription with the entity.

Then, the computer may send a message (operation 214) to an address corresponding to the telephone number, where the message includes a link to the customized second document. For example, the message may include a Short Message Service (SMS) message.

Next, when the computer receives information (operation 216) specifying activation of the link from an electronic device, the computer may provide information (operation 218) specifying the customized second document to the electronic device for display on the electronic device.

In some embodiments, the computer optionally performs one or more additional operations (operation 220). For example, the customized second document may allow completion of a given transaction in the one or more transactions, such as purchasing one or more tickets to an upcoming event. Consequently, the computer may selectively exchange information with the electronic device to perform the given transaction.

Moreover, the computer may provide authentication information (such as an authentication cookie) to the electronic device to authenticate purchases. For example, a purchase request received by the computer from the electronic device and associated with the customized second document may be rejected if the computer does not receive information that indicates that the authentication information is stored on the electronic device. Note that the authentication information may be valid for a predefined time interval. After this predefined time interval has elapsed, the authentication information may expire.

Furthermore, after receiving the information specifying activation of the hosted field (operation 210), the computer may confirm that the telephone number is included in a data structure prior to dynamically generating the customized webpage. If the telephone number is included in the data structure, the computer may proceed and dynamically generate the customized second document. Otherwise, the computer may confirm that the individual or subscriber customer wants to receive the one or more messages prior to dynamically generating the customized second document.

Additionally, when the computer receives a request message with a predefined code addressed to a second address corresponding to a second telephone number associated with the computer, the computer may dynamically generate a customized third document that includes information about one or more additional transactions of interest to the individual or subscriber customer associated with the telephone number. Then, the computer may provide a second message addressed to the address corresponding to the telephone number, where the second message includes a link to the customized third document. Note that the code may include an alphanumeric value.

In some embodiments of method 200, there may be additional or fewer operations. Moreover, there may be different operations. Furthermore, the order of the operations may be changed, and/or two or more operations may be combined into a single operation or performed at least partially in parallel.

Figure 3:
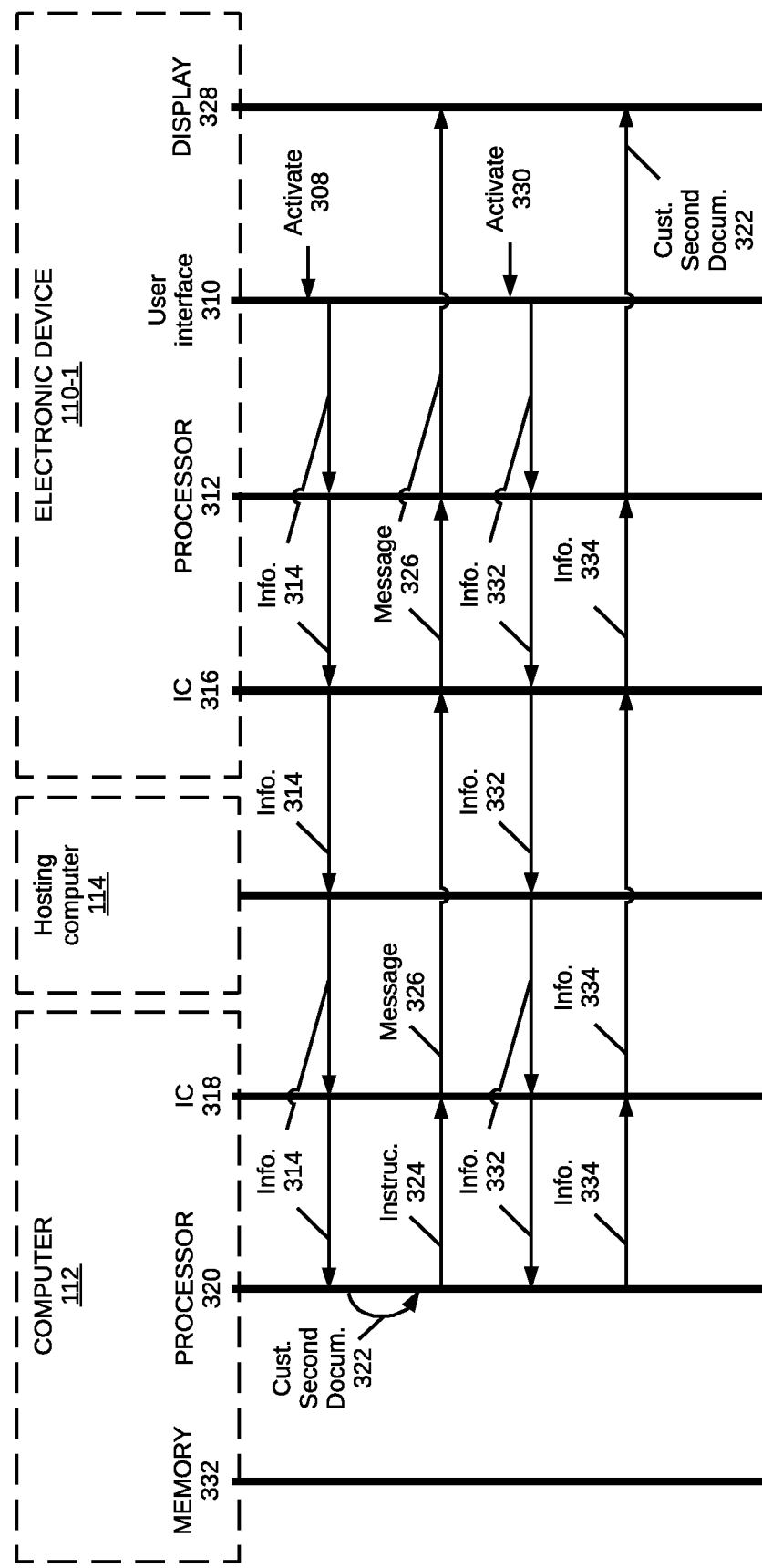
FIG. 3 is a drawing illustrating example communication among the electronic devices in FIG. 1 in accordance with an embodiment of the present disclosure.

FIG. 3 presents a drawing illustrating example communication between computer 112, hosting computer 114, and electronic device 110-1. During the communication, an interface circuit 316 in electronic device 110-1 may provide information 314 specifying activation of the hosted field in the document. For example, a user of electronic device 110-1 (such as an individual) may use a user-interface device 310 (such as a keyboard, a mouse, a touchpad, a touch-sensitive display, a voice interface, etc.) to activate 308 the hosted field in a webpage of the third party or client. Then, a processor 312 in electronic device 110-1 may provide information 314 to interface circuit 316 with an instruction or a command to communicate it to hosting computer 114.

After receiving information 314, hosting computer 114 may provide it to computer 112.

Then, after receiving information 314, an interface circuit 318 in computer 112 may provide it to processor 320 in computer 112. In response, processor 320 may dynamically generate a customized second document 322 (such as a customized second webpage) that includes information about one or more transactions of interest to the individual or subscriber customer.

Furthermore, processor 322 may instruct 324 interface circuit 318 to send a message 326 (such as an SMS message) to an address corresponding to the telephone number, where the message includes a link to the customized second document.

This message may be received by interface circuit 316, which may forward it to processor 312 for display on a display 328 in electronic device 110-1. Next, the individual or subscriber customer may use user-interface device 310 to activate 330 the link. When this occurs, processor 312 may provide information 332 to interface circuit 316 with an instruction or a command to communicate it to computer 112.

When interface circuit 318 receives information 332 specifying activation of the link, interface circuit 318 may provide it to processor 320. In response, processor 320 may provide information 334 specifying the customized second document 322 to interface circuit 318. In response, interface circuit 318 may provide information 334 to electronic device 110-1.

After receiving information 334, interface circuit 316 may provide it to processor 312, which displays customized second document 322 on display 328.

While FIG. 3 illustrates operations with single or double-sided arrows corresponding, respectively, to unilateral or bilateral communication, in general a given operation in these drawings may involve unilateral or bilateral communication. Note that the communication between components in FIG. 3 may involve communication of one or more packets or frames.

Moreover, while the preceding discussion illustrates communication of the information specifying activation of the hosted field to computer 112 via hosting computer 114, in other embodiments, electronic device 110-1 communicates this information directly to computer 112.

Furthermore, while SMS messaging was used in the preceding discussion, different communication channels may be used in other embodiments, e.g., email, Enhanced Messaging Service (EMS), and/or Multimedia Messaging Service (MMS).

We now describe embodiments of the communication technique. In these embodiments, a 'client' may be a third-party ticket provider or any third-party service or event provider.

Note that the communication technique may not simply provide a marketing channel for pre-existing content. Instead, the customized webpage (or website) may be created de novo for each subscriber customer or individual. A given subscriber customer cannot hit their webpage without a specific link that is provided to the given subscriber customer. Because the webpage does not exist before the link is created and provided to the given subscriber customer, there may not be another way to access the customized webpage. If the link for the customized second document is shared with a second individual, the second individual may browse content customized for the first individual but will be prohibited from accessing a profile of the first individual and/or executing a transaction unless the second individual subscribes and provides his/her telephone number. In such a scenario, the 3P message service sends a new link to the second individual that is customized to the second individual, the new link being customized to the second individual. The customized webpage may be curated for the given subscriber customer (e.g., based on a specific industry, events, organizer, etc.). Moreover, the customized webpage may be updated based on user habits, history, preferences, information from third-party application programming interfaces (APIs), etc. The customized webpage may pull in or incorporate additional events that may be of interest to the given subscriber customer. In addition, the communication technique may provide controls and distribute payments. For example, computer 112 (FIG. 1) may create a link that is associated with its own webpage and that can be used to create or conduct a given transaction.

In the communication technique, an Amplify Decision Delivery Processor (ADDP) may use a data structure to match, update orders, parse down information, compile links (such as HTML links), and/or provide authorization and financial information.

In some embodiments, when a client encounters the communication technique, e.g., in an application, a continuous subscriber capture (CSC) input may be injected as an input into a purchase form. Moreover, when a client installs the application, computer 112 (FIG. 1) may have access to information and, thus, the ability to sell a wide variety of their inventory.

Subsequently, when the given subscriber customer encounters a CSC input (and, more generally, a hosted field) in a webpage associated with a client, they may select a box that indicates 'yes' they would like to receive text messages. This 'yes' input may be provided to the ADDP, which may check whether a telephone number of the given subscriber customer is included in the data structure.

If their telephone number is in the data structure, the ADDP may send a text message to the given subscriber customer with a link to the customized document showing events of interest. Note that if an event organizer or client has one event, the customized document or webpage may only show one event. However, if the event organizer or client has many events, the customized document or webpage may show or include multiple events.

Alternatively, if the given subscriber customer's telephone number is not in the data structure, the ADDP may send a text message to the given subscriber customer to confirm that they want to receive text messages.

Furthermore, one or more vaults with financial information may be copied for future payments when the given subscriber customer conducts a transaction via their customized webpage.

Additionally, the ADDP may create a 'hot' cookie that goes onto the given subscriber customer's electronic device (e.g., cellular telephone) for future payments. This cookie may expire, e.g., after 30 days. If the subscriber customer attempts to use the cookie for a future payment but the cookie expired, the subscriber customer may verify their telephone number via an alphanumeric value sent to their telephone number to reactivate the cookie (make it 'hot' again).

Note that the given subscriber customer can also access their user profile via the link in the text message.

In some embodiments, the given subscriber customer can, at any time, get or receive a text message with a link to a customized webpage with events and/or user preferences by sending a text message with, e.g., a 5-digit short code to a telephone number associated with the ADDP. For example, the short code may be: an organizer name and/or a name of a provider of the communication technique (such as 'Amplify').

The communication technique may address security flaws in existing approaches (such as SIM-case swapping or fraudulent use of a link, etc.). Notably, these problems may be addressed by the use of the 'hot' cookie stored on the given subscriber customer's cellular telephone, because a fraudulent user that does not have the 'hot' cookie will not be able to access transaction information in the customized webpage or conduct a transaction when they activate the link. Thus, the 'hot' cookie may make it very difficult to game the communication technique. In order to thwart SIM swapping, in some embodiments, the communication technique may include a biometric authentication operation, such as facial recognition or recognition of another biometric marker (e.g., fingerprint recognition).

Furthermore, the ADDP may conduct reviews to verify/validate subscriber customers and their information. For example, the ADDP may review subscriber customer subscriptions (such as the event organizers or client to which a given subscriber customer has subscriptions), customer telephone numbers, etc.

Figure 4:
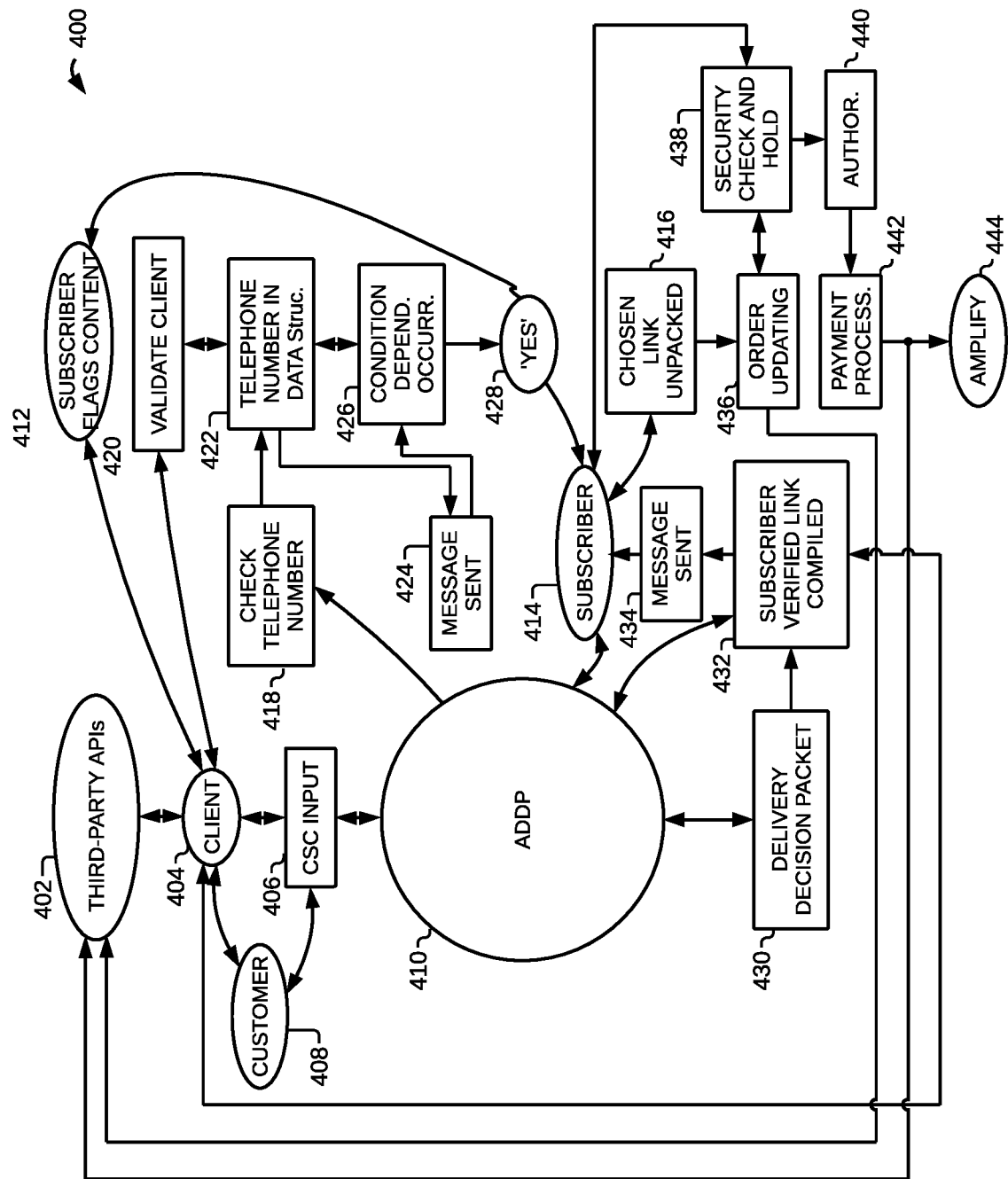
FIG. 4 is a drawing illustrating an example of a continuous subscriber flow in accordance with an embodiment of the present disclosure.
Figure 5:
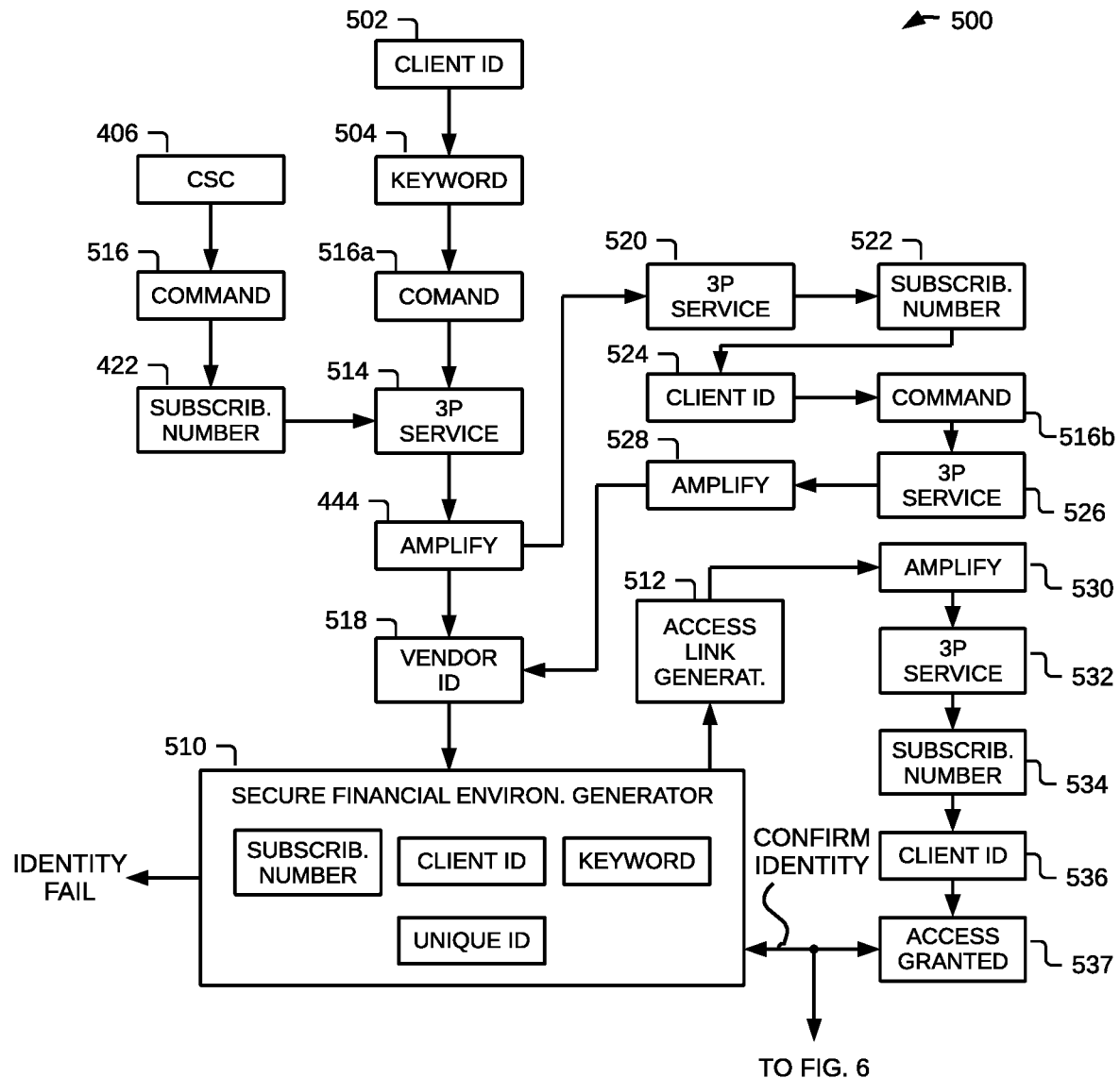
FIG. 5 is a drawing illustrating an example of a secured environment generator in accordance with an embodiment of the present disclosure.
Figure 6:
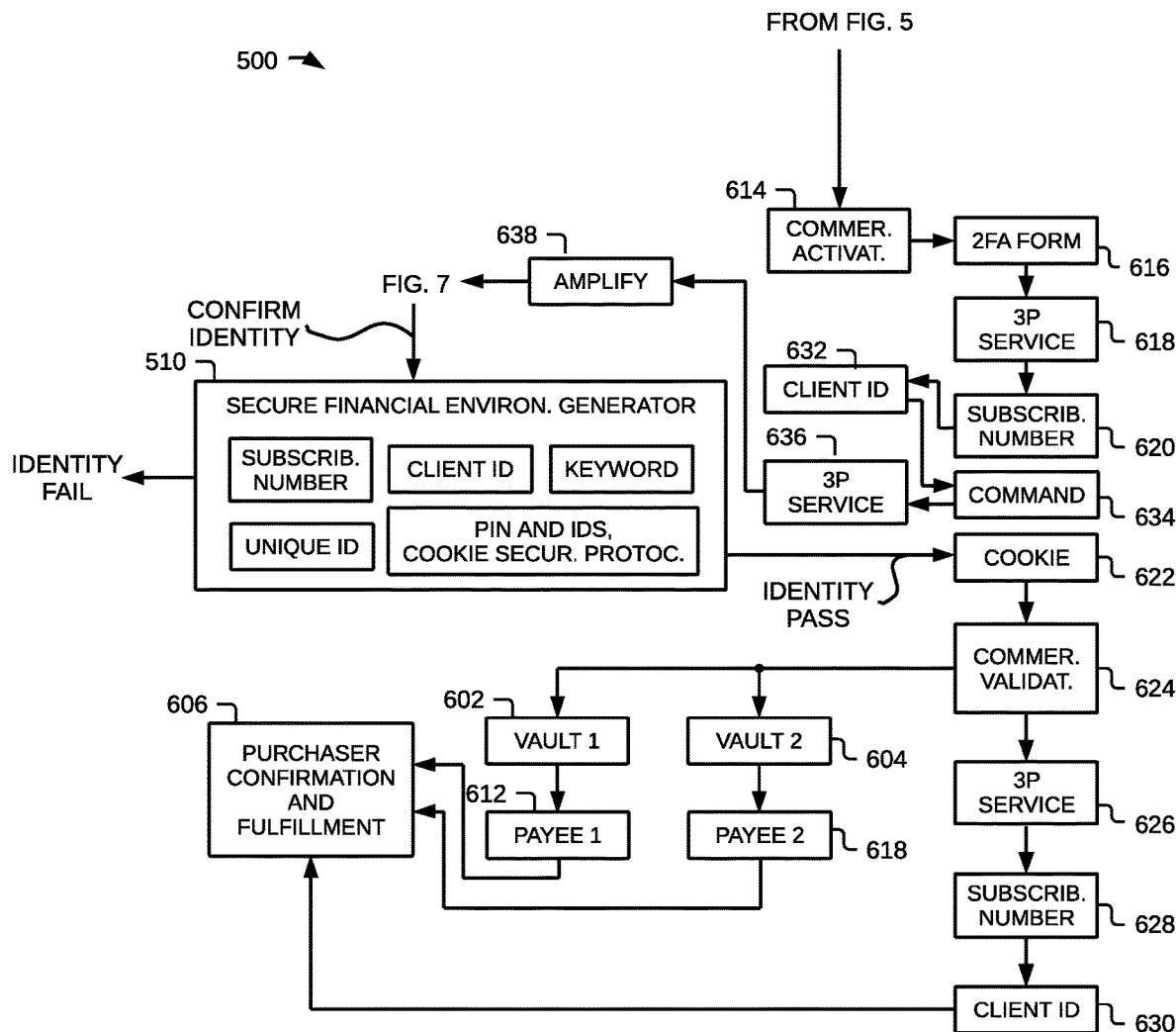
FIG. 6 is a drawing illustrating an example of the secured environment generator of FIG. 5 in accordance with an embodiment of the present disclosure.
Figure 7:
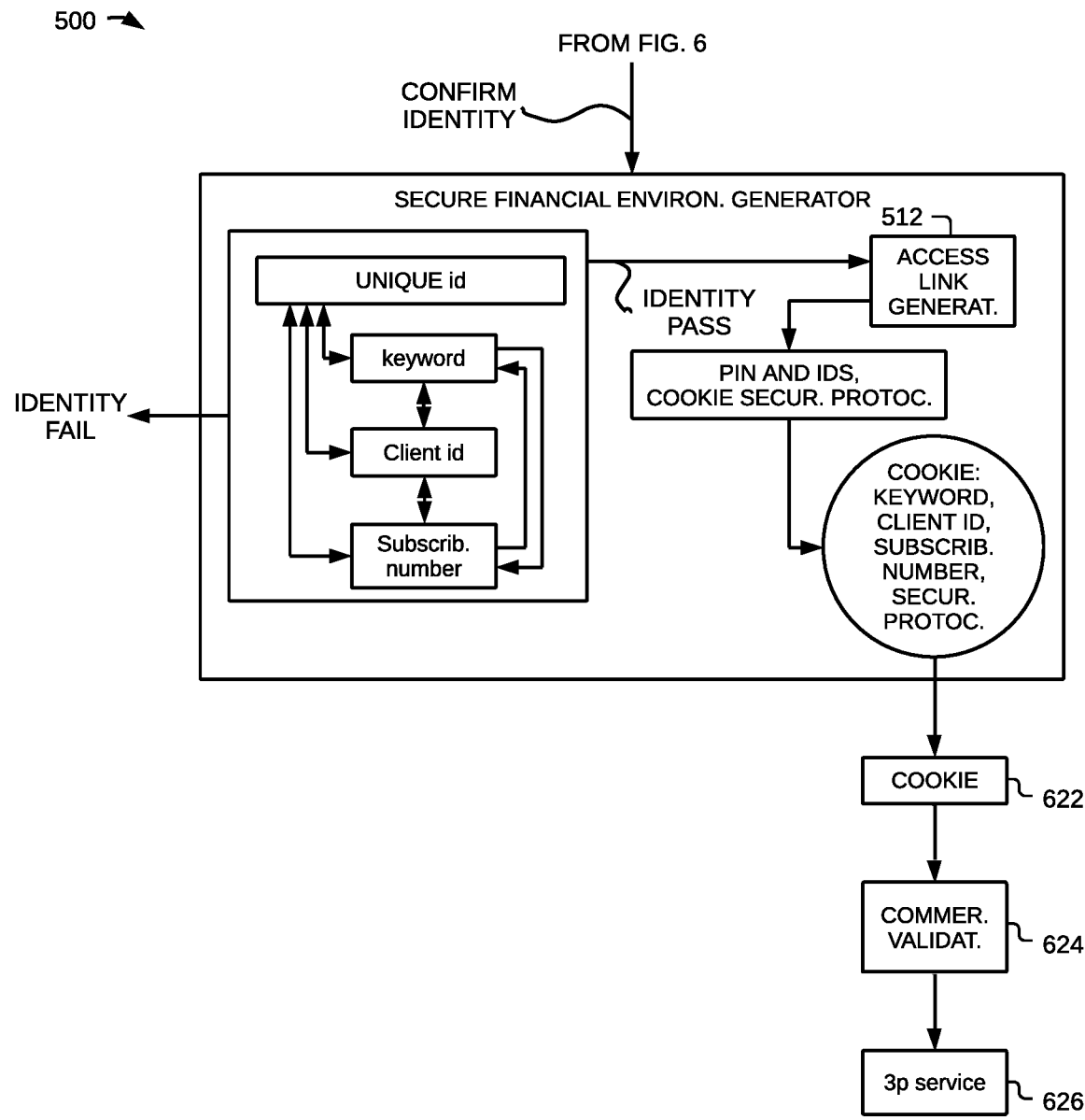
FIG. 7 is a drawing illustrating an example of the secured environment generator of FIG. 5 in accordance with an embodiment of the present disclosure.

FIG. 4 presents a drawing illustrating an example of a continuous subscriber customer flow 400, and FIGS. 5-7 presents drawings illustrating an example of a secured environment generator 500. In some embodiments, the communication technique (which is sometimes referred to as 'Amplify') may be implemented in conjunction with a third-party API 402. Notably, a custom integration implementation of Amplify 444 may be provided to the third-party API 402. This may involve access to Amplify 444 being made available inside the third-party API 402 platform to a client (such as an event organizer) that installs a software implementation of Amplify 444. Alternatively or additionally, the client 404 may allow Amplify 444 to access their client platform. For example, the client 404 may provide access codes that enable the client to pass an identifier of their third-party API platform to ADDP 410. As shown in FIG. 5, this may enable the client to create a client keyword 504 (such as an organizer word or short code) that can be texted (command 516*a*) to a telephone number associated with the ADDP 410 (or computer 112 of FIG. 1) in ADDP 410, which may result in the client becoming an ADDP client. As an ADDP client, the client may gain access to the ADDP text messaging capability via an Amplify 444 provider 3P messaging service 514. Inventory, events, etc. associated with each client are associated with a vendor ID 518.

As shown in FIGS. 4-5, as a result of becoming an ADDP client, ADDP 410 may inject a CSC input 406 into client web-purchase forms generated by the third-party API platform 402. This may enable the client 404 to allow their subscriber customers 408 to trigger the CSC input 406 to command 516 ADDP 410 to commence subscriber customer capture as an Amplify subscriber via a cellular telephone number 422 (which is sometimes referred to as a 'subscriber number') input by a subscriber customer 408 in client web-purchase forms generated by the third-party API 402.

ADDP 410 may flag a subscriber customer identifier (ID) 412 to the third-party API platform 402 for future reference and action. For example, ADDP may trigger the 3P messaging service 446 to send a text message with a unique e-commerce micro-website (e.g., a UEMWEB) abstract link (which was generated by ADDP). This micro-website may include client ticket purchase opportunities for the subscriber customer.

When the subscriber customer 414 clicks or activates a UEMWEB link, the UEMWEB abstract unpacks 416 the client ticket purchase opportunities inside a Web browser on a cellular telephone of the subscriber customer. The UEMWEB may provide options to navigate through and choose to commence an e-commerce transaction.

As shown in FIG. 5, Amplify 444 may further send a message through the 3P messaging service 520 to a subscriber customer number 442 associated with a client ID 524. The message may include an actionable item, e.g., a link to purchase tickets or view a customized webpage, such that the subscriber customer can send a command 516*b* using the 3P service 526 to view the customized webpage or purchase tickets or etc. which is sent to Amplify 528 for fulfillment and payment services.

Note that ADDP 410 may be how the client 404, the customers 408 of the client that become an Amplify subscriber, and Amplify 444 relate to each other through a matrix of conditions, abstracts and ordering of decisions. For example, an input received from a CSC input 406 may contain the third-party API platform identifier and the subscriber customer telephone number. When the telephone number details are confirmed, they may become a subscriber customer in a data structure of ADDP for future actions.

When checking the telephone number 418, the area code may be checked to geographically place and validate a location and area code of the telephone number to validate the subscriber customer 420 and verify that the subscriber customer is a customer of Amplify. Moreover, if the telephone number is a land line, it may be purged. However, if the telephone number is a cellular-telephone number, continue.

Then, whether the telephone number is in a data structure 422 may be checked to validate the subscriber customer 420. If yes, a check whether the customer is currently subscribed or unsubscribed to Amplify 444 for a current client may be performed. If yes 428, conditions are checked and acted upon. However, if no, an opt-in verification message may be sent 424. Note that conditional dependent occurrences 426 may include determining if an opt-in message 424 is needed.

When opt-in occurs, the customer becomes a subscriber 414. Notably, a subscriber customer 414 may be added to the Amplify data structure. Moreover, the subscriber customer 414 may be flagged to the client 412, and the client 404 thereafter may have access to the subscriber customer 414.

During content delivery matching, the organization's attributes may be checked, such as a type, industry, events, inventory, etc. Moreover, subscriber customer preferences may be checked via the third-party API and/or a data structure of preferences/history, etc. Then, the relevant event details are pulled through the third-party API for compiling of abstracts. Next, the relevant content to be compiled in a packet is decided 430, such as: which partner's events, which specific events, single event, events list, etc. This information may be curated via third-party API(s). Furthermore, when the subscriber customer verification is checked, a trackable link is compiled 432. Additionally, the message may be sent to the subscriber customer 434. When the subscriber customer interacts with the content, an order may be created and updated 436 accordingly in line with subscriber customer actions and available inventory in tandem with third-party API checks.

During an Amplify security check and hold 438, the subscriber customer may: navigate to UEMWEB, undertake choosing ticket purchase options, provide financial information (such as credit-card details) in a UEMWEB purchase form, and may activate a command to authorize 440 an e-commerce transaction. After ADDP receives a command, it may trigger the 3P messaging service to send a, e.g., 4-digit PIN code to subscriber customer via MMS/SMS. This PIN code may be input into a purchase form during authorization 440 to enable the subscriber customer to activate a command to commence a, e.g., credit-card charge. This may trigger payment processing 442.

During payment processing, a secured financial environment generator 500 may: require a client ID 502, a client keyword 504, a client third-party API platform identifier, and a subscriber customer telephone number 422 to interoperate in order to drive encryption (such as UIE encryption), which allows an e-commerce transaction to commence. When these operations are confirmed and compiled, the secured financial environment generator 500 may pass security checks, may provide authorization for the transaction to continue, and may place a packet containing UIE and PIN into a subscriber customer verified link 512.

Moreover, the secured financial environment generator 510 may generate a hot cookie that may include information specifying the keyword, client, subscriber customer, and protocol, and may place it and activate it in the purchase form, as shown in FIG. 6. The hot cookie is stored locally on the device of the subscriber customer for a defined period of time, as described elsewhere herein. Once the hot cookie is validated, an access link is generated 512 and sent through Amplify 530 to a subscriber customer number 534 associated with a client ID 536 using the 3P messaging service 532 to allow account access 536 to complete a purchase. Validation of the hot cookie confirms the identity of the client and further allows access 536 to complete a purchase.

Turning to FIGS. 6-7. Once access is granted in FIG. 5 information stored in the hot cookie allows commerce to be activated at 614. Information is input into a 2-factor authentication form (2FA Form) 616 sent via 3P messaging service 618 from subscriber customer number 620 associated with client ID 632. Once the form 616 is completed and transmitted at command 634 via 3P messaging service 636 through Amplify 638, the identity of the subscriber customer transmitting the form is confirmed through the secure financial environment generator 510. Once the identity is confirmed using the hot cookie 622, the commerce is validated at 624, which may allow financial information (such as credit-card charges) to process and pass authorization and processing.

This may trigger ADDP to deliver financial information (such as credit-card details) to Vault 1 602 as well as Vault 2 604 based on partnership requirements in certain payment abstract scenarios. Moreover, it may enable credit-card charges to be made and completed resulting in purchase confirmation and fulfillment 606. While this is occurring, a hold may be placed on the credit card (or another financial vehicle) of the subscriber customer.

Next, ADDP may trigger the 3P messaging service 626 to send a notification (such as an SMS message) to the subscriber customer number 628 associated with client ID 630 with a link to purchased tickets as a result of a purchase confirmation and fulfillment details 606.

Furthermore, ADDP may manage updating inventory of the client via the third-party API as a result of a purchase confirmation and fulfillment. ADDP may transfer credit-card charge receipts to one or more payees 610, 612, such as the client if they are the merchant of record. Alternatively, the third-party API may push the delivery payment receipt to the client if they are the merchant of record.

We now describe embodiments of an electronic device, which may perform the communication technique. FIG. 8 presents a block diagram of an example of an electronic device 800, such as one of: electronic devices 110, computer 112, hosting computer 114, optional base station 120 or optional access point 122. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, one or more GPUs, and/or one or more digital signal processors (DSPs).

Memory subsystem 812 includes one or more devices for storing data and/or instructions for processing subsystem 810 and networking subsystem 814. For example, memory subsystem 812 can include dynamic random-access memory (DRAM), static random-access memory (SRAM), a read-only memory (ROM), flash memory, and/or other types of memory. In some embodiments, instructions for processing subsystem 810 in memory subsystem 812 include: one or more program modules or sets of instructions (such as program instructions 822 or operating system 824), which may be executed by processing subsystem 810. For example, a ROM can store programs, utilities or processes to be executed in a non-volatile manner. Further, for example, DRAM can provide volatile data storage and may store instructions related to the operation of electronic device 800. Note that the one or more computer programs may constitute a computer-program mechanism, a computer-readable storage medium, or software. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810. In some embodiments, the one or more computer programs are distributed over a network-coupled computer system so that the one or more computer programs are stored and executed in a distributed manner.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Figure 8:
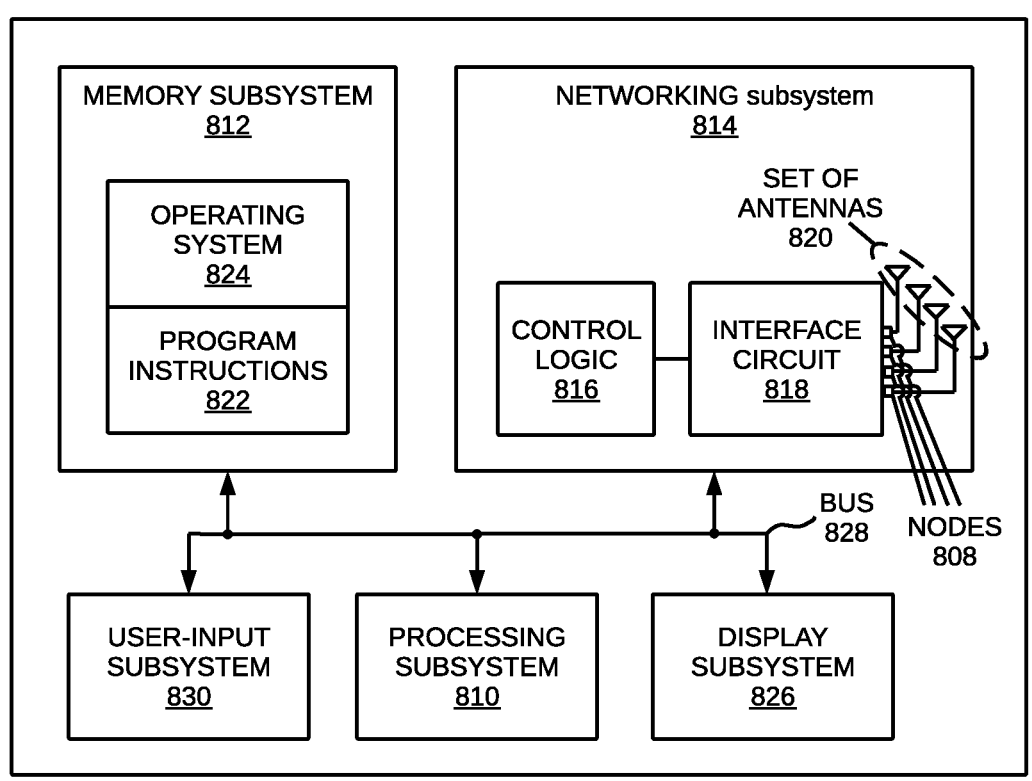
FIG. 8 is a block diagram illustrating an example of one of the electronic devices of FIG. 1 in accordance with an embodiment of the present disclosure.

Networking subsystem 814 includes one or more devices configured to couple to and communicate on a wired and/or wireless network (i.e., to perform network operations), including: control logic 816, an interface circuit 818 and a set of antennas 820 (or antenna elements) in an adaptive array that can be selectively turned on and/or off by control logic 816 to create a variety of optional antenna patterns or 'beam patterns.' (While FIG. 8 includes set of antennas 820, in some embodiments electronic device 800 includes one or more nodes, such as nodes 808, e.g., a pad, which can be coupled to set of antennas 820. Thus, electronic device 800 may or may not include set of antennas 820.) For example, networking subsystem 814 can include a Bluetooth networking system, a cellular networking system (e.g., a 3G/4G/5G network such as UMTS, LTE, etc.), a universal serial bus (USB) networking system, a networking system based on the standards described in IEEE 802.9 (e.g., a Wi-Fi® networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices.

Within electronic device 800, processing subsystem 810, memory subsystem 812, and networking subsystem 814 are coupled together using bus 828 that facilitates data transfer between these components. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc. Display subsystem 826 may be controlled by processing subsystem 810 to display information to a user.

Electronic device 800 can also include a user-input subsystem 830 that allows a user of the electronic device 800 to interact with electronic device 800. For example, user-input subsystem 830 can take a variety of forms, such as: a button, keypad, dial, touch screen, audio input interface, etc.

Electronic device 800 can be (or can be included in) any electronic device with at least one network interface. For example, electronic device 800 may include: a cellular telephone or a smartphone, a smartwatch, a wearable device, a tablet computer, a laptop computer, a notebook computer, a personal or desktop computer, a netbook computer, a media player device, an electronic book device, a smartwatch, a wearable computing device, a portable computing device, a consumer-electronic device, as well as any other type of electronic computing device having wireless communication capability that can include communication via one or more wireless communication protocols.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program instructions 822 are included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814. This integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 822, operating system 824 (such as a driver for interface circuit 818) or in firmware in interface circuit 818. Alternatively or additionally, at least some of the operations in the communication technique may be implemented in a physical layer, such as hardware in interface circuit 818.

One aspect of the present disclosure is directed to a computer comprising: an interface circuit configured to communicate with an electronic device; a processor coupled to the network interface and memory; and the memory configured to store program instructions. In any of the preceding embodiments, when the program instructions are executed by the processor, they cause the computer to perform operations comprising: receive information specifying activation of a hosted field in a document associated with a third party; in response to receiving the information specifying the activation of the hosted field, dynamically generate a customized second document that includes information about one or more transactions of interest to an individual associated with the telephone number; send a message to an address corresponding to the telephone number; and when the computer receives information, associated with the electronic device associated with the telephone number, which specifies activation of the link, provide information, intended for the electronic device, specifying the customized second document.

In any of the preceding embodiments, the information specifies a willingness to receive one or more messages from the computer and specifies a telephone number.

In any of the preceding embodiments, the message comprises a link to the customized second document.

In any of the preceding embodiments, the document comprises a webpage associated with a third party.

In any of the preceding embodiments, the message comprises a Short Message Service (SMS) message.

In any of the preceding embodiments, the customized second document comprises a webpage.

In any of the preceding embodiments, the customized second document facilitates completion of a given transaction in the one or more transactions.

In any of the preceding embodiments, the operations comprise providing authentication information intended for the electronic device to authenticate the given transaction.

In any of the preceding embodiments, the given transaction is rejected by the computer when the computer does not receive confirmation that the authentication information is stored on the electronic device.

In any of the preceding embodiments, the authentication information comprises an authentication cookie.

In any of the preceding embodiments, the authentication information is valid for a predefined time interval.

In any of the preceding embodiments, the operations comprise: determining, after receiving the information specifying activation of the hosted field, whether the telephone number is included in a data structure prior to dynamically generating the customized webpage; when the telephone number is included in the data structure, proceeding and dynamically generating the customized second document; and otherwise, confirming that the individual wants to receive the one or more messages prior to dynamically generating the customized second document.

In any of the preceding embodiments, the one or more transactions of interest to the individual are associated with an entity, and the individual has a subscription with the entity.

In any of the preceding embodiments, the operations comprise: receiving a request message associated with the electronic device, wherein the request message comprises predefined code addressed to a second address corresponding to a second telephone number associated with the computer; dynamically generating a customized third document that comprises information about one or more additional transactions of interest to the individual associated with the telephone number; and providing a second message addressed to the address corresponding to the telephone number, wherein the second message comprises a link to the customized third document.

Another aspect of the present disclosure relates to a non-transitory computer-readable storage medium for use in conjunction with a computer, the computer-readable storage medium storing program instructions that, when executed by the computer, cause the computer to carrying out one or more operations. In any of the preceding embodiments, the operations comprise: receiving information specifying activation of a hosted field in a document associated with a third party; in response to receiving the information specifying the activation of the hosted field, dynamically generating a customized second document that includes information about one or more transactions of interest to an individual associated with the telephone number; sending a message to an address corresponding to the telephone number; and when the computer receives information, associated with an electronic device associated with the telephone number, which specifies activation of the link, providing information, intended for the electronic device, specifying the customized second document.

In any of the preceding embodiments, the information specifies a willingness to receive one or more messages from the computer and specifies a telephone number.

In any of the preceding embodiments, the message comprises a link to the customized second document.

In any of the preceding embodiments, the document comprises a webpage associated with a third party.

In any of the preceding embodiments, the message comprises a Short Message Service (SMS) message.

In any of the preceding embodiments, the customized second document comprises a webpage.

In any of the preceding embodiments, the customized second document facilitates completion of a given transaction in the one or more transactions.

In any of the preceding embodiments, the one or more operations comprise providing authentication information intended for the electronic device to authenticate the given transaction.

In any of the preceding embodiments, the given transaction is rejected by the computer when the computer does not receive confirmation that the authentication information is stored on the electronic device.

In any of the preceding embodiments, the one or more operations comprise: determining, after receiving the information specifying activation of the hosted field, whether the telephone number is included in a data structure of prior to dynamically generating the customized webpage; when the telephone number is included in the data structure, proceeding and dynamically generating the customized second document; and otherwise, confirming that the individual wants to receive the one or more messages prior to dynamically generating the customized second document.

In any of the preceding embodiments, the one or more transactions of interest to the individual are associated with an entity, and the individual has a subscription with the entity.

In any of the preceding embodiments, the one or more operations comprise: receiving a request message associated with the electronic device, wherein the request message comprises predefined code addressed to a second address corresponding to a second telephone number associated with the computer; dynamically generating a customized third document that comprises information about one or more additional transactions of interest to the individual associated with the telephone number; and providing a second message addressed to the address corresponding to the telephone number, wherein the second message comprises a link to the customized third document.

Another aspect of the present disclosure is directed to a method for dynamically generating a customized second document, the method being performed by a computer. In any of the preceding embodiments, the method comprises receiving information specifying activation of a hosted field in a document associated with a third party; in response to receiving the information specifying the activation of the hosted field, dynamically generating the customized second document that includes information about one or more transactions of interest to an individual associated with the telephone number; sending a message to an address corresponding to the telephone number; and when the computer receives information, associated with an electronic device associated with the telephone number, which specifies activation of the link, providing information, intended for the electronic device, specifying the customized second document.

In any of the preceding embodiments, the information specifies a willingness to receive one or more messages from the computer and specifies a telephone number.

In any of the preceding embodiments, the message comprises a link to the customized second document.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A system comprising:
a processor; and
memory configured to store program instructions, wherein, when executed by the processor, the program instructions cause the processor to perform operations comprising:
providing, to a third party, a hosted field for inclusion in a first document associated with the third party;
receiving, information indicating activation of the hosted field in the first document, wherein the information comprises a telephone number and an indication of a willingness to receive one or more messages;
generating, a second document that includes information about one or more events of interest for a user associated with the telephone number, the second document being customized to an interest of the user;
sending a message to an electronic address corresponding to the telephone number, wherein the message comprises a link to the second document, the link being configured to:

allow the user to access the second document to execute one or more transactions associated with the one or more events, and allow users other than the user to access the second document to browse the second document while prohibiting execution of the one or more transactions through the link for the users other than the user;

in response to determining activation of the link has occurred, providing the second document to the electronic address;

enabling one or more additional transactions associated with the one or more events for the users other than the user when receiving a subscription request and an associated telephone number associated with the users other than the user;

generating an updated link accessible by the users other than the user to perform the one or more additional transactions; and providing the updated link to the associated telephone number.

2. The system of claim 1, wherein the first document comprises a webpage.

3. The system of claim 1, wherein the message comprises a Short Message Service (SMS) message.

4. The system of claim 1, wherein the second document comprises a webpage.

5. The system of claim 1, wherein the second document facilitates completion of a given transaction in the one or more transactions.

6. The system of claim 5, wherein the operations further comprise:

providing authentication information intended for an electronic device associated with the user to authenticate the given transaction, wherein the given transaction is rejected when confirmation that the authentication information is stored on the electronic device is not received.

7. The system of claim 6, wherein the authentication information is valid for a predefined time interval.

8. The system of claim 6, wherein the authentication information comprises an authentication cookie configured to be stored on the electronic device associated with the user and the second document.

9. The system of claim 1, wherein the second document is a customized webpage and wherein the operations further comprise:

determining, after receiving the information specifying activation of the hosted field, whether the telephone number is included in a data structure prior to generating the second document;

when the telephone number is included in the data structure, generating the second document; and otherwise, confirming the indication of the willingness to receive the one or more messages prior to generating the second document.

10. The system of claim 1, wherein the one or more events of interest are associated with an entity, and the user has a subscription with the entity.

11. The system of claim 1, wherein the operations comprise:

receiving, from an electronic device associated with the user, a request message including a predefined code addressed to a second address corresponding to a second telephone number;

generating a third document that comprises information about one or more additional events of interest to the user associated with the second telephone number; and providing a second message addressed to the address corresponding to the second telephone number, wherein the second message comprises a link to the third document.

12. The system of claim 1, wherein the third party is an event ticket provider.

13. A non-transitory computer-readable storage medium for use in conjunction with a computer, the computer-readable storage medium storing program instructions that, when executed by the computer, cause the computer to carry out one or more operations comprising:

providing, to a third party, a hosted field for inclusion in a first document associated with the third party;

receiving, information indicating activation of the hosted field in the first document, wherein the information comprises a telephone number and an indication of a willingness to receive one or more messages;

generating a second document that includes information about one or more events of interest for a user associated with the telephone number, the second document being customized to an interest of the user according to user habits or user history;

sending a message to an electronic address corresponding to the telephone number, wherein the message comprises a link to the second document, the link being configured to:

allow the user to access the second document to execute one or more transactions associated with the one or more events, and allow users other than the user to access the second document to browse the second document while prohibiting execution of the one or more transactions through the link for the users other than the user; and in response to determining activation of the link has occurred, providing the second document to the electronic address;

receiving, from an electronic device associated with the user, a request message including a predefined code addressed to a second address corresponding to a second telephone number;

generating a third document that comprises information about one or more additional events of interest to a user associated with the second telephone number; and providing a second message addressed to the address corresponding to the second telephone number, wherein the second message comprises a link to the third document.

14. The non-transitory computer-readable storage medium of claim 13, wherein the first document comprises a webpage.

15. The non-transitory computer-readable storage medium of claim 13, wherein the message comprises a Short Message Service (SMS) message.

16. The non-transitory computer-readable storage medium of claim 13, wherein the second document facilitates completion of a given transaction in the one or more transactions;

wherein the one or more operations further comprise providing authentication information intended for an electronic device associated with the user to authenticate the given transaction; and wherein the given transaction is rejected by the computer when the computer does not receive confirmation that the authentication information is stored on the electronic device.

17. The non-transitory computer-readable storage medium of claim 13, wherein the second document is a customized webpage and wherein the one or more operations further comprise:
   determining, after receiving the information specifying activation of the hosted field, whether the telephone number is included in a data structure prior to generating the second document;
   when the telephone number is included in the data structure, generating the second document; and
   otherwise, confirming the indication of the willingness to receive the one or more messages prior to generating the second document.

18. A computer-implemented method for dynamically generating a customized second document, comprising:
   providing, to a third party, a hosted field for inclusion in a first document associated with the third party;
   receiving, information indicating activation of the hosted field in the first document, wherein the information comprises a telephone number and an indication of a willingness to receive one or more messages;
   generating, a second document that includes information about one or more events of interest for a user associated with the telephone number;
   sending a message to an electronic address corresponding to the telephone number, wherein the message comprises a link to the second document, the link being configured to:
      allow the user to access the second document to execute one or more transactions associated with the one or more events, and
      allow users other than the user to access the second document to browse the second document while prohibiting execution of the one or more transactions through the link for the users other than the user; and
   in response to determining activation of the link has occurred, providing the second document to the electronic address;
   receiving, from an electronic device associated with the user, a request message including a predefined code addressed to a second address corresponding to a second telephone number;
   generating a third document that comprises information about one or more additional events of interest to a user associated with the second telephone number; and
   providing a second message addressed to the address corresponding to the second telephone number, wherein the second message comprises a link to the third document.

\* \* \* \* \*